Patented Jan. 25, 1938

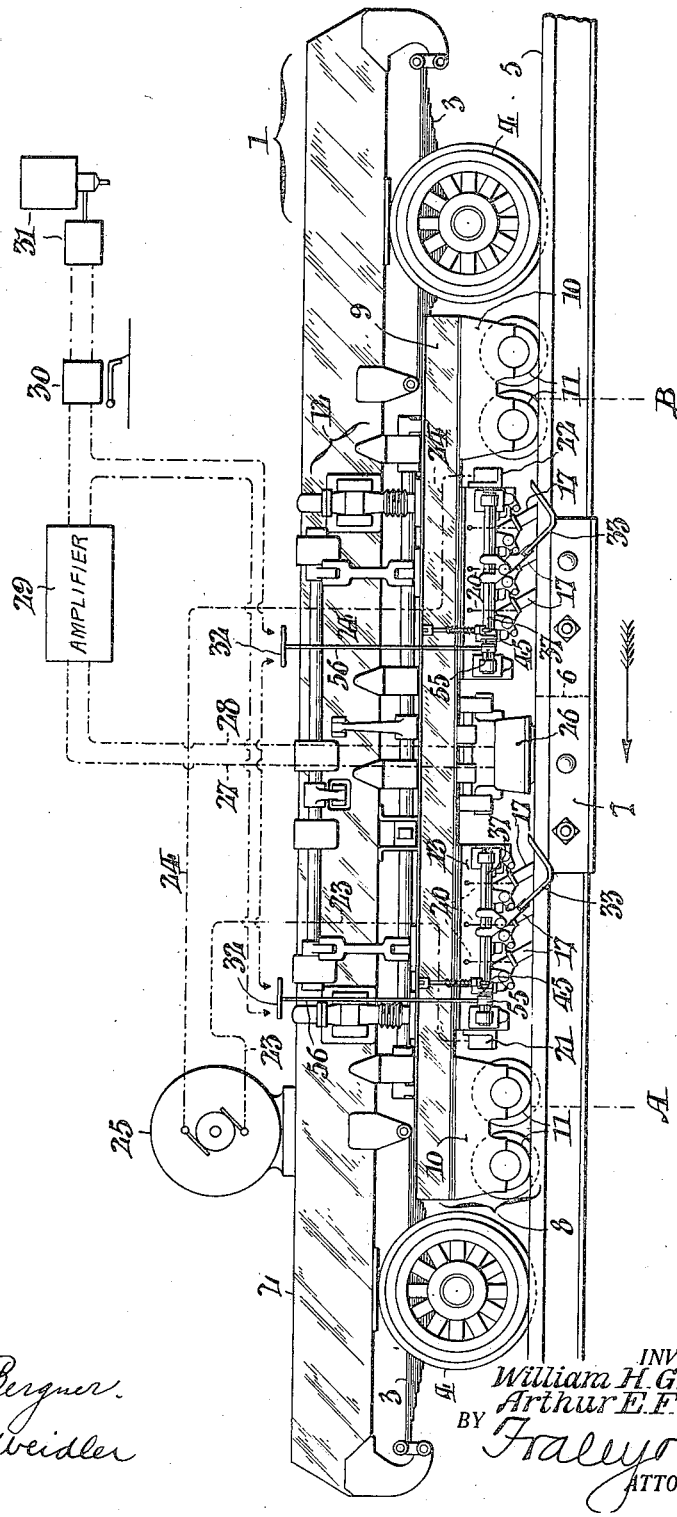

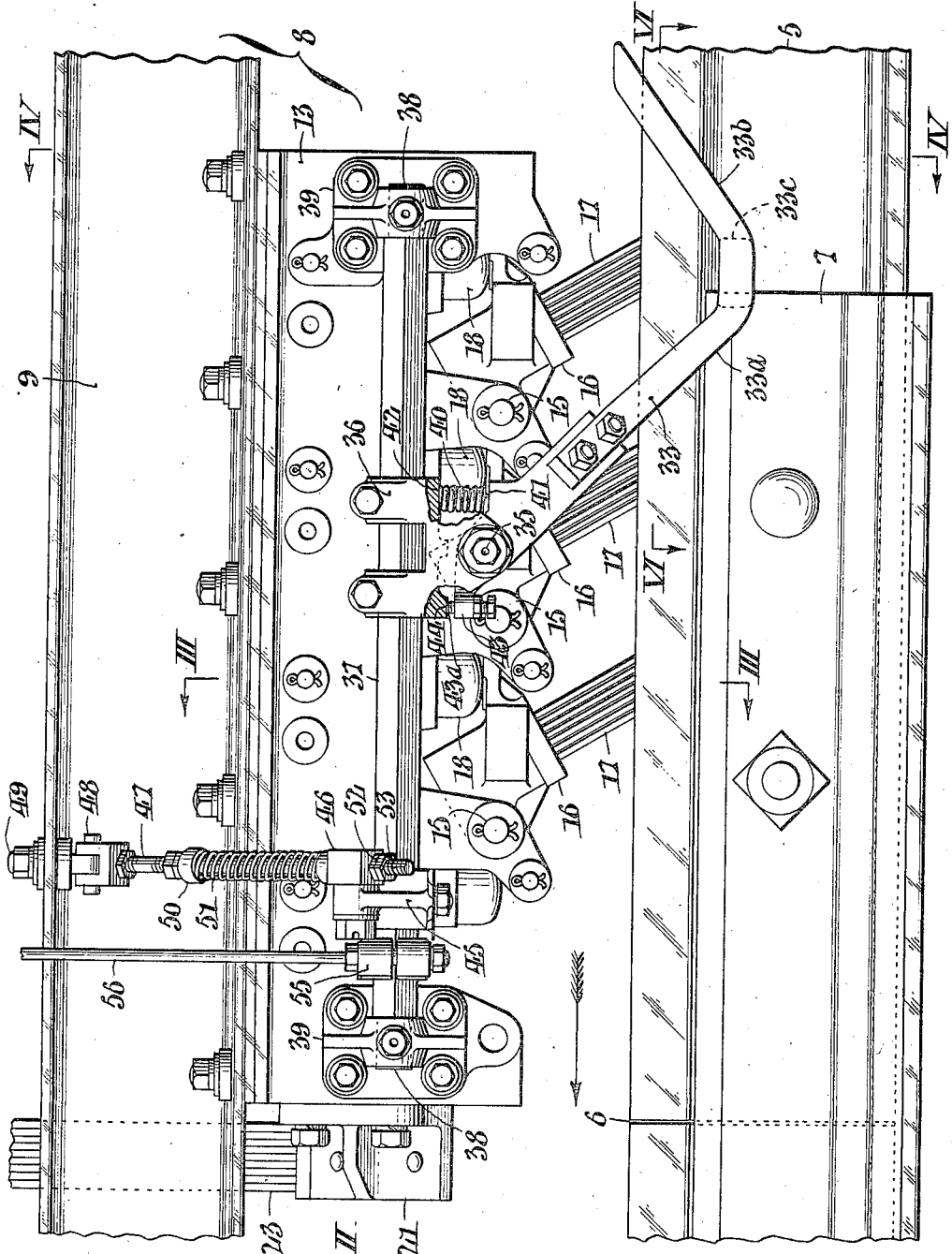

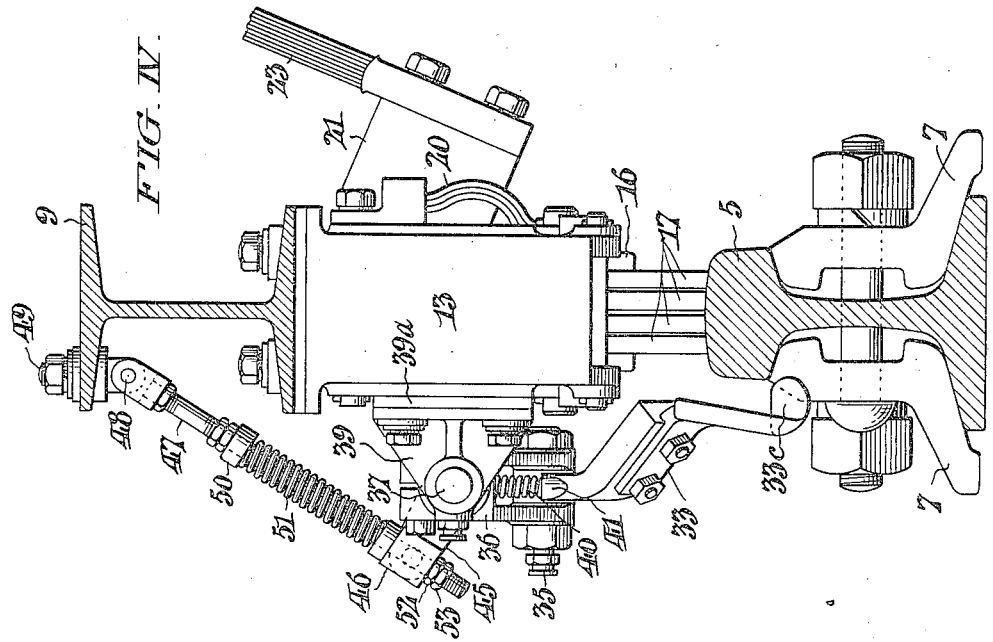
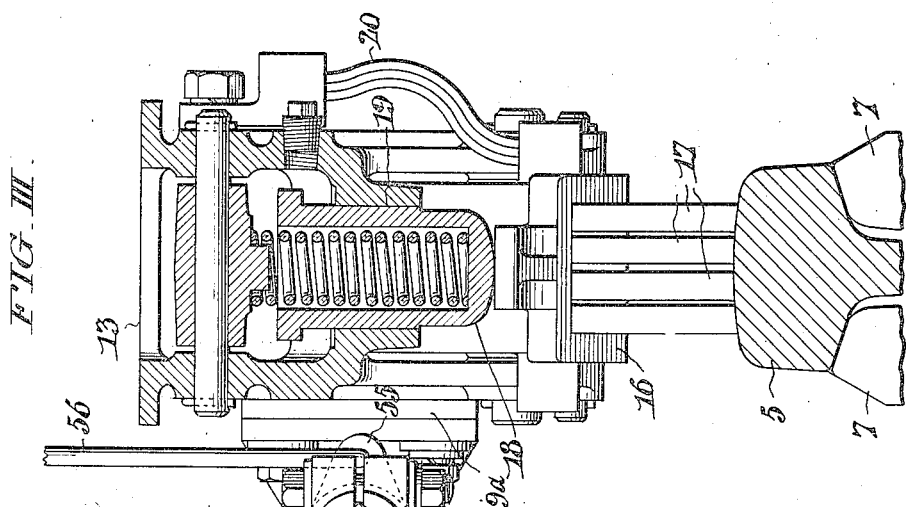

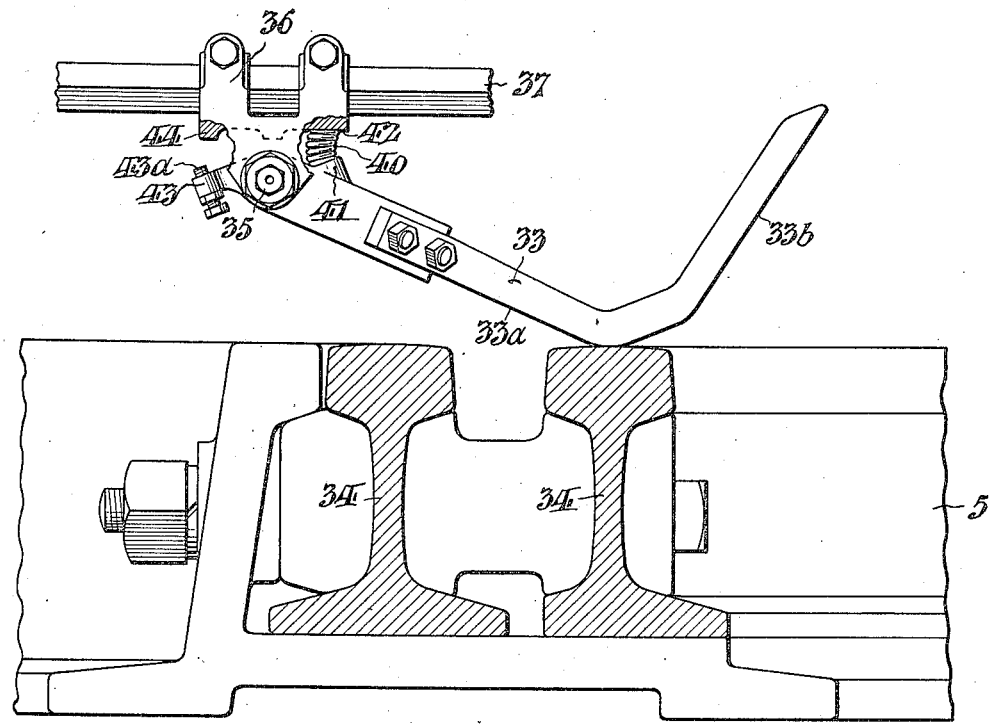
FIG. V.
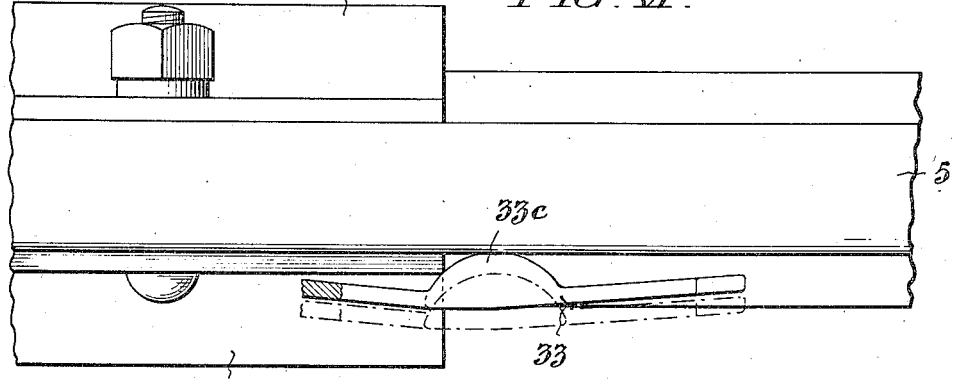
FIG. VI.

2,106,694

UNITED STATES PATENT OFFICE 2,106,694

TRACK RAIL FLAW DETECTING APPARATUS

William H. Grindall and Arthur E. F. Billstein, Altoona, Pa., assignors to The Pennsylvania Railroad Company, Philadelphia, Pa., a corporation of Pennsylvania Application July 23, 1935, Serial No. 32,696

10 Claims. (Cl. 175—183)

This invention relates to the electrical and magnetic testing of railroad rails for the detection of defects such as cracks, internal fissures and flaws, "pipes", etc. The invention is especially concerned with the avoidance of undesired indications of joints in railroad track, which may be mistaken for indications of defects, or may complicate and confuse any graphic record made of the indications, etc. Besides suspending the indications throughout a period sufficient to insure against any influence of the joints on them, we provide against injury to the means employed for this purpose by cross-overs, switches and highway crossings in the track being tested,—or other obstructions adjacent the track—without interrupting detection of flaws in the rails under test.

In testing rails as above referred to, the rail may be in a magnetic field, which may be produced by passing a suitable electric current through the rail. For this purpose, there may be suitably spaced brushes connected to any suitable source of (direct) current. Any local peculiarity or defect in the rail produces a corresponding distortion of the magnetic field, which may be made apparent by passing along the rail a suitable detector device or exploring unit in which electric current or electrical impulse(s) will be produced by the magnetic field or its variations. One such detector is shown and described in U. S. Patent No. 1,963,931, to Arthur E. F. Billstein, one of the present applicants, granted June 19, 1934. The electrical current-variations or impulses in the detector circuit can be suitably amplified to afford power for producing any desired indication or record, such as a bell or buzzer signal, a graphic record on a paper tape, or even a mark on the defective portion of the rail. It is generally convenient to mount the detector and the associated equipment on one or more railway cars, and to haul or propel the car(s) along the track, testing both the track rails at the same time.

In order to avoid actuation of the indicating means by distortions of the magnetic field in the rail produced by the rail-joints, provision is made for interrupting the transmission of the electrical impulses from the detector or exploring unit to the indicating means when passing the rail joints, by means operated by such joints. For this purpose, in accordance with our invention, we may interrupt the electric circuit anywhere between the detector and the indicating means proper, though we prefer to interpose suitable interrupting means in the indicating-circuit that operates or controls a recording pen for a record-tape and a rail-marking paint-gun for marking the locations of defects in the rail(s). This has the advantage that the current in such circuit is greater and the voltage only moderate, making contact difficulties in the interrupter less troublesome. Also, possibilities of false indications due to secondary effects from making (or breaking) circuit anywhere between the detector and the indicating circuit are thus avoided. To assure freedom of the indications from the influence of joint bars, provision is made for maintaining the interruption above referred to from a time when the detector approaches a joint-bar until it passes beyond such bar. For this purpose, in the apparatus here shown, there is an interrupter-actuating device for engaging the joint-bar about as the detector reaches it and another such device for engaging the bar before the first-mentioned device leaves the bar, so that the interruption is maintained until the detector passes beyond said bar. Thus the indicating means is rendered inoperative during a suitable period while passing each joint-bar.

Preferably we provide against injury or operation of our actuating devices by obstructions along the rails, such as cross-overs, switches and highway crossings in the track being tested, by arranging the actuating devices to yield or be displaced by engagement with such obstructions, as well as for actuation by the joint-bars. The actuating devices may have an actuating or operating movement different from such yielding movement for passing obstructions.

Preferably, also, we make provisions for changing the spacing of the actuating devices so that the extent of the rail length eliminated from detection at the regions of the rail joints may be increased or decreased as desired or required.

Other features and advantages of the invention will appear from the following description of a species or form of embodiment thereof, and from the drawings.

In the drawings, Fig. I is a side elevation of a track-rail flaw detecting apparatus conveniently embodying the present improvements.

Fig. II is a detail view in side elevation showing a portion of the apparatus on a larger scale.

Figs. III and IV are cross sections taken as respectively indicated by the lines and arrows III—III and IV—IV in Fig. II.

Fig. V is a fragmentary detail view showing how the switch opening means is protected against injury incident to passage over the rails of a crossover track; and Fig. VI is a detail sectional view taken as indicated by the line and arrows VI—VI in Fig. II.

The rail flaw detecting apparatus herein illustrated includes a car 1 which is adapted to travel in the direction of the arrow in Fig. I. The frame 2 of this car is supported, with interposition of springs 3, by wheels 4 of the usual flanged type which are adapted to run on the track rails under test, one of the rails being indicated at 5 with contiguous sections thereof abutting at a joint 6 and rigidly connected, after common practice, by a joint bar 7. Connected to the frame of the car 1 at each side thereof is a carriage 8 whereof the body is in the form of an I-beam 9 which is supported at its opposite ends by trucks 10 each having two flanged wheels 11 also adapted to run on the rails 5. A suitable lifting gear comprehensively indicated in Fig. I by the numeral 12 is provided at each side of the car 1 for lifting the carriage 8 and holding it lifted from the rail 5 during travel of the car from one location of operation to another. This lifting gear is described and claimed in a separate patent application Serial No. 32,695 filed simultaneously herewith, to which reference may be had for details, if necessary. Bolted in longitudinally spaced relation to the bottom flange 9 of the I-beam of the carriage 8 immediately inward of the wheel trucks 10 are pendant brackets 13 which afford pivots 15 (Fig. II) for the holders 16 of flexible electric brushes 17 whereof there are, in the illustrated instance, two groups with three brushes in each group. Spring urged plungers 18 axially slidable in vertical guideways 19 (Fig. III) of the brackets 13 bear downwardly upon the brush holders 16 and keep the brushes 17 in firm yielding contact with the rail 5. The brackets 13 are suitably insulated from the I-beam 9, and the brush holders 16 are electrically connected individually to said brackets by flexible conductors such as shown at 20 in Figs. III and IV. To the remote ends of the brackets are bolted terminal lugs 21 and 22 for flexible conductors 23 and 24, which as diagrammatically shown in Fig. I are connected to an electric generator 25 supported in this instance on the car 1. If deemed more convenient in practice, the generator 25 may be mounted on a separate car. By virtue of this arrangement, electric current is continuously passed through the rail 5 between the two sets of brushes 17. Suspended from the beam 9 of the carriage 8 in the interval between the two brush groups at each side of the car 1 is an exploring unit or detector 26 which may be of the type disclosed in the patent hereinbefore referred to, and which is sensitive to variations in the magnetic flux caused by imperfections in the rail 5. As shown, the detector 26 is connected by conductors 27 and 28 in circuit with a conventionally illustrated amplifier 29. The impulses received from the detector and strengthened by the amplifier 29 are utilized to electrically actuate any suitable indicating or recording means, such as a stylus by which the impulses are recorded on a moving paper chart or tape as well as a paint spray for marking the rail at the location of the detected flaw, said recording and marking devices being diagrammatically shown in Fig. I at 30 and 31 respectively.

Interposed in the output circuit of the amplifier 29 in which the devices 30 and 31 are connected are a pair of circuit-interrupting means in the form of switches 32, which are adapted to be opened and held open in overlapping succession while the detector 26 passes over the joints 6 in the rail 5, to prevent functioning of said devices at these times. The means provided for automatically actuating the switches 32 includes a corresponding pair of fingers 33 which are associated with the two groups of brushes 17 on the carriage 8. The fingers 33 are identical in their construction and appointments so that the description which follows in the singular will hold for both of them. From Figs. II and IV it will be noted that each finger 33 is pivoted for up and down movement at 35 on a support member 36 which is adjustably clamped on a square shaft 37 whereof the cylindric ends 38 are journaled in bearings 39 secured, with interposition of insulation 39a (Figs. III and IV), to the bracket 13. As illustrated, the finger 33 is of angular configuration with provision of inclined fore and aft cam edges 33a and 33b adapted to override the rails 34 of crossover tracks after the manner shown in Fig. V, irrespective of the direction of travel of the car 1. The upward swing of the finger 33 when thus idly overriding obstructions is yieldingly resisted by a helical spring 40 in compression between a shoulder 41 on said finger and an abutment surface 42 on the member 36. Normally, under the action of the spring 40, the finger 33 is maintained in the position shown in Fig. II by engagement of an adjustable screw 43a in a projection 43 on the finger with a stop 44 on the member 36. By adjusting the screw 43a, it will be seen, the finger 33 can be raised or lowered to change its normal operative position vertically in respect to the rail 5.

Clamped on the shaft 37 near its forward bearing 39 is an arm 45 (Figs. II and IV) to the end of which is pivoted an apertured block 46 slidingly engaged around the lower end of an inclined rod 47. As shown, the rod 47 has a pivotal connection 48 at its upper end with an eye bolt 49 secured, with interposition of suitable insulation, to the upper flange of the beam 9 of the carriage 8. Surrounding the rod 47, in the interval between a collar 50 thereon and the block 46 on the arm 45, is a compression spring 51 which normally maintains said block in contact with a stop nut 52 engaging screw threads at the lower end of said rod. A jamb nut 53 serves to secure the stop nut 52 after adjustment of the latter on the rod 47. Through the action of spring 51 and coaction between the arm 45 on the shaft 37 and the stop nut 52 on the rod 47, the finger 33 is normally maintained yieldingly in a definite position transversely of the track rail 5 with a side cam or shoe 33c at the angle thereof reaching to a point adjacent the outer faces of the joint bars 7 at one side of the rail 5, as shown in Fig. IV. The nuts 52, 53 afford means for adjusting finger 33 and its cam portion 33c laterally relative to the rail. Thus, as the car 1 travels along the rail 5, the shoe 33c on the finger 33 is engaged by the joint bars 7 and swung outward to the dot-and-dash line position in Fig. IV, imparting a clockwise movement to the shaft 37 in opposition to the spring 51. This movement is translated, through another arm 55 on the shaft 37 between the forward bearing 39 of the latter and the arm 45, into vertical movement of a rod 56 extending to the corresponding switch 32 to open the latter. It is to be particularly observed from Fig. I that the spacing of the two fingers 33 is such that the second one of them (as considered with respect to the direction of travel) encounters the joint bar 7 just before the first one leaves said joint bar. It therefore follows that the output circuit of the amplifier 29 is held open for a period sufficient for passage of the exploring unit 26 over the rail joint 6, so as to preclude the recording of the joint on the chart of the recorder 30 as well as to prevent actuation of the paint spray device 31. With the fingers 33 set as shown, the switches 32 in the indicating circuit are kept open while the detector 26 passes from B to A (Fig. I) on the rail 5. Thus it will be seen that those portions of the rail 5 beyond opposite ends of the joint bar 7 in which the influence of said joint upon the magnetic flux might cause indications are eliminated from the test. Obviously, by adjusting the finger(s) 33 along the shaft(s) 37, the distance A—B may be increased or decreased as may be desired or found advantageous in practice.

From the foregoing it will be apparent that, through our invention, it is possible to obtain a chart with accurate recordings of flaws in the rail without conflicting and complicating indications of the rail joints,—with avoidance, in addition, of useless markings of the rails with paint at the joints and attendant saving of the paint.

Having thus described our invention, we claim:

1. The combination with track-rail flaw-detecting and indicating apparatus movable along the track, of an actuator device carried by said detecting and indicating apparatus adjacent a rail of said track and mounted for diverse movements, one way by engagement with rail-joint-bars and another way by engagement with obstructions along the track, such as highway crossings, cross-overs, and switches, and means actuated by one of the aforesaid movements of said actuator device to temporarily render said apparatus inoperative, so as to avoid undesired indications, but unaffected by the other of the aforesaid movements of said actuator device.

2. The combination with track-rail flaw-detecting and indicating apparatus movable along the track, of an actuator device carried by said detecting and indicating apparatus adjacent a rail of said track and swingable both laterally and up and down relative to the track, and means actuated by the lateral swing of said actuator due to engagement with rail-joint-bars to temporarily render said apparatus inoperative, so as to avoid undesired indications, but unaffected by the up and down swing of said actuator in passing obstructions along the track, such as highway crossings, cross-overs, and switches.

3. The combination with track-rail flaw-detecting and indicating apparatus movable along the track and means for temporarily rendering the same inoperative to avoid undesired indications, of a spring-urged actuating finger for said last-mentioned means, and means pivotally mounting said finger for lateral actuating movement when engaged with rail-joint-bars and for idle up and down movement to override obstructions such as track-switches, cross-overs, and highway crossings.

4. The combination with track-rail flaw-detecting and indicating apparatus movable along the track and switch means for temporarily rendering the same inoperative to avoid undesired indications, of spaced-apart movable actuator devices carried by said detecting and indicating apparatus adjacent a rail of said track, for successive actuation by its joint bars, and adjustable toward and from one another, and means affording mechanical operating connection from said devices to said switch means, for actuating of the latter by the movements of the former, in all relative positions of said devices, so that by adjustment of said devices as aforesaid the aggregate period of inoperativeness of the indicating means due to a joint bar may be correspondingly adjusted.

5. The combination with track-rail flaw detecting apparatus including a carriage adapted to run on the track-rail under test, and an indicating circuit with interrupting switch means therein, of a shaft on said carriage extending lengthwise of the track, with operating connection to said switch means, and an actuating finger on said shaft for engaging the rail-joint bars as the carriage travels along the rail and operating the shaft to keep the switch open while passing rail-joints.

6. The combination with track-rail flaw detecting apparatus including a carriage adapted to run on the track-rail under test, and an indicating circuit with interrupting switch means therein, of a shaft on said carriage extending lengthwise of the tracks, with operating connection to said switch means, and an actuating finger for engaging the rail-joint bars as the carriage travels along the rail and operating the shaft to keep the switch open while passing rail-joints, said finger having a pivotal connection to the shaft permitting it to idly override obstructions such as track-switches, cross-overs, and highway crossings.

7. The combination with track-rail flaw detecting apparatus including a carriage adapted to run on the track-rail under test, and an indicating circuit with interrupting switch means therein, of a shaft on said carriage extending lengthwise of the track, with operating connection to said switch means, and an actuating finger for engaging the rail-joint bars as the carriage travels along the rail and operating the shaft to keep the switch open while passing rail-joints, said finger having a pivotal connection to the shaft permitting it to idly override obstructions such as track-switches, cross-overs, and highway crossings, and being adjustable to change its normal position relative to the track-rail under test.

8. The combination with track-rail flaw detecting apparatus including a carriage adapted to run on the track-rail under test, and an indicating circuit with interrupting switch means therein, of a shaft on said carriage extending lengthwise of the track, with operating connection to said switch means, an actuating finger for engaging the rail-joint bar as the carriage travels along the rail and operating the shaft to keep the switch open while passing rail-joints, said finger having a pivotal connection to the shaft permitting it to idly override obstructions such as track-switches, cross-overs, and highway crossings, and means for adjusting said finger both vertically and laterally to change its normal position relative to the track rail under test.

9. The combination with track-rail flaw detecting apparatus including a carriage adapted to run on the track-rail under test, and an indicating circuit with interrupting switch means therein, of a shaft on said carriage extending lengthwise of the track, with operating connection to said switch means, and an actuating finger on said shaft having a lateral cam shoe projection for engaging the rail-joint bars as the carriage travels along the rail and operating the shaft to keep the switch open while passing rail-joints, said finger having a pivotal connection to the shaft and fore and aft cam surfaces for overriding obstructions such as track-switches, crossovers, and highway crossings.

10. The combination with track-rail flaw detecting apparatus including a carriage adapted to run on the track-rail under test, and an indicating circuit with interrupting switch means therein, of shafts on said carriage extending lengthwise of the track, with operating connections to said switch means, and actuating fingers mounted on said shafts, and adjustable lengthwise thereof, for engaging the rail-joint bars as the carriage travels along the rail and operating the shafts and switch means to keep said indicating circuit open while passing rail joints.

WILLIAM H. GRINDALL.
ARTHUR E. F. BILLSTEIN.